United States Patent [19]

Okada

[11] Patent Number: 4,586,096
[45] Date of Patent: Apr. 29, 1986

[54] CASSETTE LOADING/EJECTING DEVICE
[75] Inventor: Hitoshi Okada, Tokyo, Japan
[73] Assignee: Clarion Co., Ltd., Tokyo, Japan
[21] Appl. No.: 499,932
[22] Filed: Jun. 1, 1983
[30] Foreign Application Priority Data Jun. 7, 1982 [JP] Japan ................................. 57-96288
Jun. 15, 1982 [JP] Japan ................................. 57-101301

[51] Int. Cl.⁴ ............................................ G11B 15/66
[52] U.S. Cl. .................................. 360/96.5; 360/71; 360/93
[58] Field of Search ................... 360/96.5, 96.6, 96.1, 360/137, 93, 71, 90

[56] References Cited

U.S. PATENT DOCUMENTS 4,087,841 5/1978 Tanaka et al. ........................ 360/71
4,295,169 10/1981 Iwata et al. ............................ 360/71
4,308,562 12/1981 Negishi ............................... 360/96.5
4,403,265 9/1983 Okada et al. .......................... 360/71
4,404,606 9/1983 Watanabe ............................. 360/90
4,434,444 12/1980 Sato ................................... 360/96.5

FOREIGN PATENT DOCUMENTS

0017007 2/1977 Japan .................................... 360/71

Primary Examiner—John H. Wolff
Assistant Examiner—David J. Severin
Attorney, Agent, or Firm—Flynn, Thiel, Boutell & Tanis

[57] ABSTRACT

The cassette loading/ejecting device in a tape player includes a slide plate slidable from front to rear of the tape player and a pack guide connected to the slide plate to carry the cassette inserted into the tape player so as to effect cassette loading and ejection by displacement of the cassette between its inserted position and its play position in accordance with movement of the slide plate, and the cassette loading/ejecting is characterized in that a drive mechanism for transmitting motor rotation to the slide plate is interposed between a one-way rotatable motor and the slide plate, the drive mechanism is provided with a changeover mechanism to invert the rotation transmitted from the motor, the changeover mechanism includes a changeover plate disposed rotatable adjacent to a drive gear linked to the motor, and a changeover gear carried by the changeover plate for engagement with the drive gear, an inversion plate disposed adjacent to one end of the changeover plate for simultaneous rotation with the slide plate, and an inversion spring connected between the inversion plate and the adjacent end of the changeover plate so that pushing direction of the inversion spring against the changeover plate is inverted according to pivoted angle of the inversion plate.

3 Claims, 8 Drawing Figures

CASSETTE LOADING/EJECTING DEVICE

BACKGROUND OF THE INVENTION

1. Field of the Invention

This invention relates to a cassette-type tape player and more particularly to a so-called autoloading type tape player for automatic loading and ejection of a tape cassette.

2. Description of the Prior Art and Problems Involved Therein

To effect automatic loading/ejection of a cassette in a cassette-type tape player, it is most usual to use driving force of a tape driving motor to drive a cassette loading/ejection mechanism. More specifically, upon insertion of a tape pack (cassette), when it is manually brought into a pack guide of the tape player, a switch attached to the pack guide detects it and connects the pack guide to the tape driving motor via gears and other power transmitting means. Thereby, the driving force of the motor is transmitted to the pack guide and automatically pulls it into the tape player. After this operation, the connection between the motor and the pack guide is released. Upon ejection of the tape pack, when an eject signal is applied to the tape driving motor, the pack guide is reconnected to the tape driving motor. The motor power moves the pack guide to the contrary to push it and the tape pack thereon together out of the tape player.

To move the pack guide in the opposite directions upon loading and ejection of the tape pack as described in the above, it is necessary to rotate a motor in two opposite directions. In this connection, a conventional tape player is arranged to switch polarity of a power source so as to change rotating directions of the motor between tape pack loading and ejection.

In such tape player, however, since the rotating direction of the motor upon tape pack loading is contrary to that upon tape pack ejection, it is not prevented that the motor suddenly rotates to the contrary upon starting of tape reproduction or cassette loading/ejection and that a reverse generated output is produced due to inertia of the motor which is caused by the sudden opposite rotation, thereby causing troubles of the motor and the changeover switch.

OBJECT OF THE INVENTION

It is therefore an object of the present invention to alleviate the drawbacks involved in the prior art, and more specifically to provide a cassette loading/ejection device in a tape player which is designed not to rotate a motor in opposite directions between loading and ejection of a tape pack and therefore free from troubles of the motor or a changeover switch caused by cassette loading and ejecting operations.

A further object of the invention is to provide a cassette loading/ejection device in a tape player wherein driving force from a one-way rotational motor is inverted by a changeover means between cassette loading and ejection before transmitted to a pack guide, said changeover means can take three positions for cassette loading mode, neutral mode and cassette ejection mode, to prevent overrun of the pack guide due to inertia of the motor, thereby setting a tape at a precise play position with a simple construction not involving a clutch mechanism or another motor for cassette loading.

SUMMARY OF THE INVENTION

According to the invention, the cassette loading/ejection device includes a motor for one-way rotation to drive a pack guide and a changeover mechanism interposed between the motor and a slide plate for shifting the pack guide so as to invert rotating force from the motor.

The changeover mechanism in the invention, in particular, comprises a changeover plate rotatably disposed near a driving gear interlocked with the motor, a changeover gear supported by the changeover plate for meshing engagement with the driving gear in accordance with movement of the changeover plate, and an inversion plate mounted at one end of the changeover plate for simultaneous rotation with the slide plate, the inversion plate and said one end of the changeover plate being connected by an inversion spring so that the direction in which the inversion spring push the changeover plate is inverted in accordance with the pivoting angle of the inversion plate.

Further, the invention proposes to provide the changeover plate with a cam having three cam portions for loading, neutral and ejection and to employ a pin engaging the cam and interlocking with a plunger responsive to positions of the slide plate interlocking with the pack guide, so that the plunger engages and disengages the changeover gear on the changeover plate with or from the driving gear connected to the motor.

BRIEF DESCRIPTION OF THE DRAWINGS

FIGS. 3 to 8 are plan views showing different modes of the driving and changeover mechanisms, namely wherein:

DETAILED DESCRIPTION OF A PREFERRED EMBODIMENT (A) CONSTRUCTION

The invention will now be described in detail by way of a preferred embodiment referring to the drawings.

(Pack Guide Section)

Figure 1:
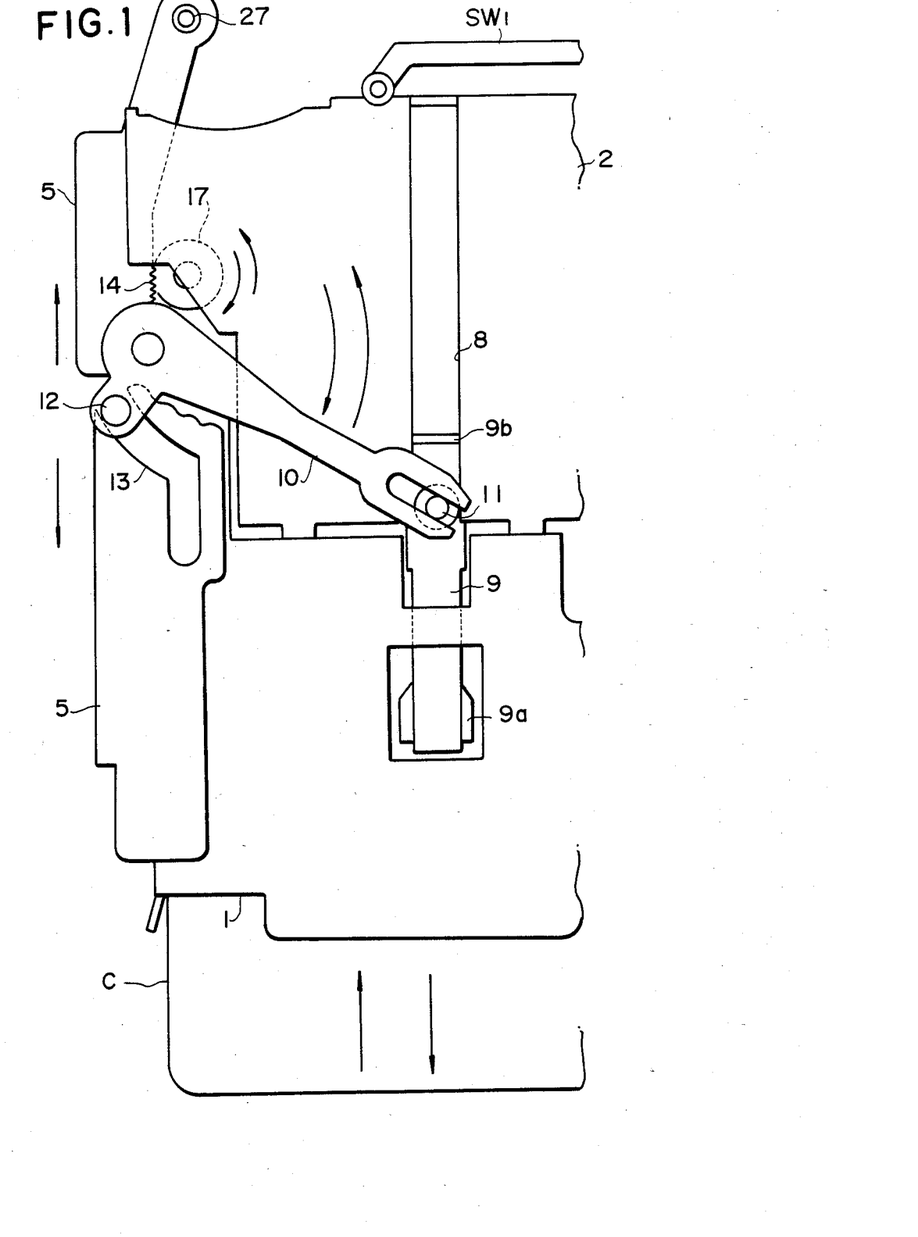
FIG. 1 is a plan view showing the cassette loading/ejection mechanism.
Figure 2:
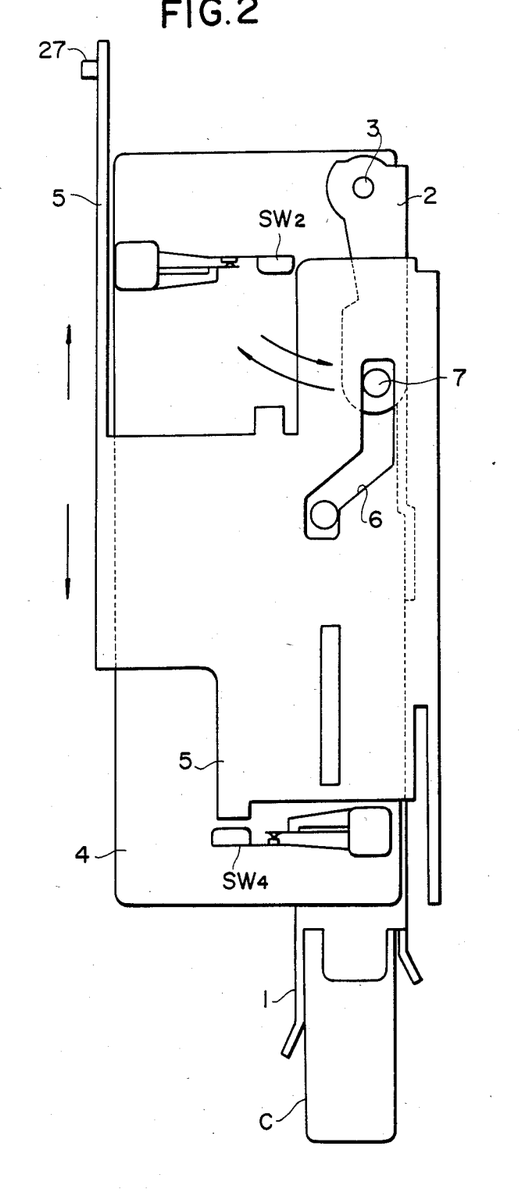
FIG. 2 is a side view of the mechanism of FIG. 1.

FIGS. 1 and 2 show the mechanism of a pack (cassette) guide and relavant members. In the Figures, reference numeral 1 denotes the pack (cassette) guide located on a base plate (not shown). A guide arm 2 is also positioned on the base plate but rearward of the pack guide 1. The guide arm 2 is connected at a rear lateral end thereof to a side plate 4 by a pin 3 so that the front end of the guide arm 2 is pivotable about the pin 3 downwardly from its horizontal state. The pivotal front end of the guide arm 2 is linked to the upper face of the pack guide 1 to shift and lower the pack guide 1 on the base plate in accordance with up and down movement of the guide arm 2.

A slide plate 5 is mounted beside the side plate 4 in a manner wrapping the side plate 4 from outside thereof and slidable in the front to rear direction of the device.

The slide plate 5 is formed with a lifting cam 6 to receive therein a guide pin 7 projecting from the side wall of the guide arm 2. The lifting cam 6 includes two different cam zones, i.e. one for lifting motion and the other for lowering motion. Thereby, in accordance with movement of the guide pin 7 along the cam 6, the guide arm 2 pivots about the pin 3 substantially vertically of the device.

The guide arm 2 has at the center of the upper plate thereof a guide slot 8 extending in front-to-rear direction of the device and slidably receiving therein a pack stopper 9 made of a plastic material.

The front end of the pack stopper 9 reaches a central portion of the upper plate of the pack guide 1 and has formed at the lower face thereof with a nail 9a to engage a reel hole of a cassette. The rear end of the pack stopper 9 has formed with a stopper tongue 9b extending downward to contact a tip of a cassette inserted into the pack guide 1.

The upper periphery of the side plate 4 has an upper plate which slidably contacts an upper plate of the slide plate 5. On the upper plate of the side plate 4 is pivotally linked a central corner portion of a generally L-shaped swing lever 10. The tip of one arm of the swing lever 10 is divided so as to make a U-like configuration to slidably receive therein a pin 11 provided on the upper face of the pack stopper 9. The tip of the other arm of the swing lever 10 has formed with a guide roller 12 extending upward to enter in a loading/ejecting cam hole 13 formed in the upper horizontal plate of the slide plate 5.

The loading/ejecting cam hole 13 also includes two cam zones i.e. one for loading and the other for ejection similarly to the lifting cam 6 so that in accordance with front and rear movement of the slide plate 5, the cam 13 pushes and guides the guide roller 12 to rotate the swing lever 10 about the central corner thereof to move the pack stopper 9 engaging the tip of the swing lever 10 frontward or rearward along the guide hole 8 of the guide arm 2.

(Driving Mechanism)

Figure 3:
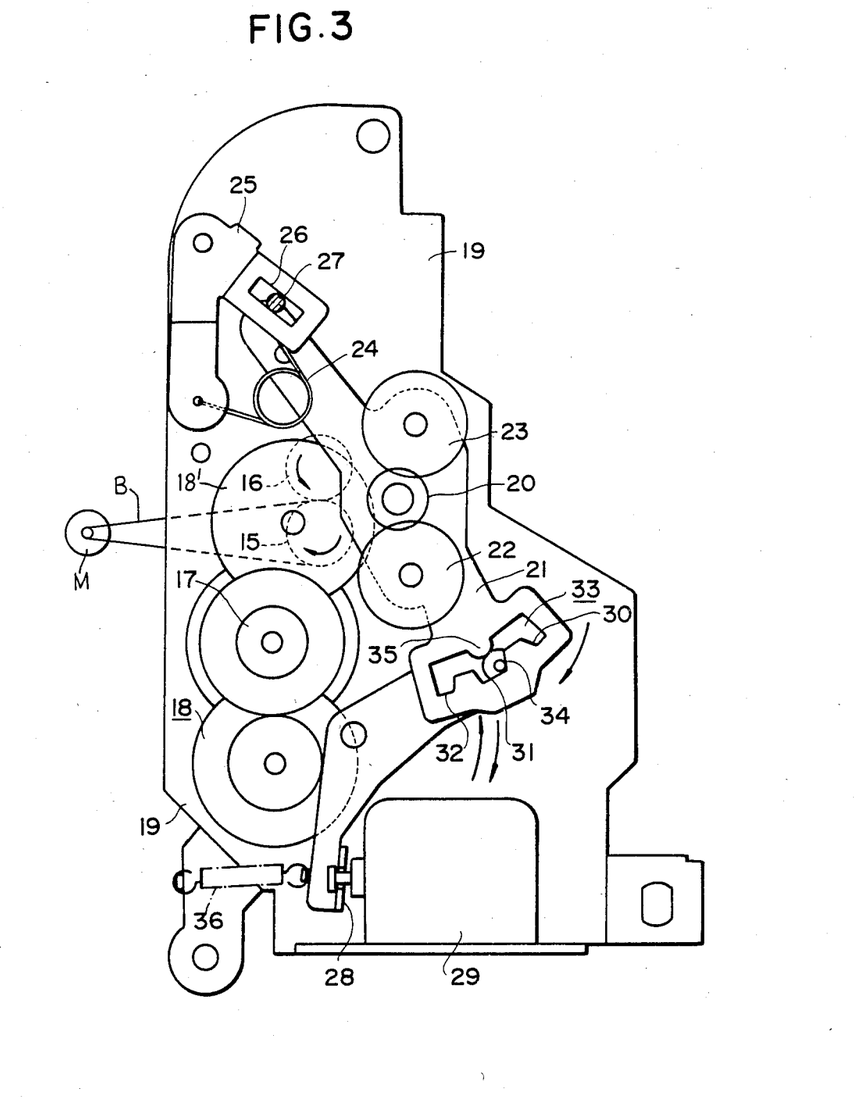
FIG. 3 shows said mechanisms before cassette loading, FIG. 4 show said mechanisms at the start of cassette loading.

The slide plate 5 has formed along a lateral edge of the lower horizontal plate thereof with a rack 14 which engages a gear of a driving mechanism driven by a tape driving motor. The driving mechanism has a structure as shown in FIG. 3 and comprises a loading drive gear 15 and an ejection drive gear 16 both always driven by a motor M, a gear 17 engaging the rack 14 of the slide plate 5, a reduction gear series 18 to rotate the gear 17 at a predetermined speed, and a changeover means to selectively link the reduction gear series 18 to the loading drive gear 15 or the ejection drive gear 16.

The loading drive gear 15 and the ejection drive gear 16 rotate in the opposite directions to each other, and one of them i.e. the loading drive gear 15, for example, is linked to the tape driving motor M via a link member such as belt B, etc.

(Changeover Mechanism)

The changeover mechanism to selectively link the reduction gear series 18 to the loading drive gear 15 or the ejection drive gear 16 in order to invert rotating direction of the reduction gear series 18 has the following structure.

A transmission gear 20 is pivotally mounted about an axis provided on a base plate 19 of the changeover mechanism. The transmission gear 20 always engages the input gear 18' of the reduction gear series 18. A changeover plate 21 is pivotally supported at a central portion thereof by the axis of the transmission gear 20 and carries thereon a loading changeover gear 22 and an ejection changeover gear 23 both sandwiching and engaging the transmission gear 20. The two changeover gears 22 and 23 on the changeover plate 21 are opposed to the loading drive gear 15 and the ejection drive gear 16, respectively, so that the loading drive gear 15 engages the loading changeover gear 22 or alternatively the ejection drive gear 16 engages the ejection changeover gear 23.

An inversion plate 25 is linked to one end of the changeover plate 21 via an inversion spring 24. The inversion plate 25 is generally a V-shaped member with the center thereof pivotally mounted on the base plate 19. The tip of one arm of the inversion plate 25 and said one end of the changeover plate 21 are connected to each other by the inversion spring 24 having a torsion spring configuration. For connection between the inversion plate 25 and spring 24 the inversion plate 25 has formed at the other end thereof a through hole to pivotally receive therein one end of the inversion spring 24. For connection between the changeover plate 21 and the inversion spring 24, a pin is secured to said one end of the changeover plate to permit a hooked end of the inversion spring 24 to pivotally engage therewith.

The other arm of the V-shaped inversion plate 25 has formed with a slit 26 extending in the length direction thereof to slidably receive therein a pin 27 provided on the slide plate 5 of said loading/ejecting mechanism. More specifically, the slide plate 5 comprises one vertical plate and upper and lower horizontal plates as explained before, and the lower horizontal plate has formed at the rear end portion thereof with the pin 27 extending downward therefrom to be inserted in the slit 26 of the inversion plate 25.

(Plunger 29)

The other end of the changeover plate 21 is connected to a plunger 29 via a pivotal lever 28. More specifically, said end of the changeover plate 21 has formed with a cam hole 33 which is generally sectorial and has three concavities i.e. loading portion 30, neutral portion 31 and ejecting portion 32. The cam hole 33 receives therein a pin 34 projecting from one end of the pivotal lever 28.

At a central portion of the edge along the sectorial cam hole 33 is provided a projection 35 opposed to the neutral concavity 31 to force the pin 34 to fall into the concavity 31 on the way of displacement within the cam hole 33 between the loading and ejecting concavities 30 and 32.

The pivotal lever 28 is pivotally mounted at the center thereof about a pin secured to the base plate 19. One end of the pivotal lever 28 remote from the changeover plate 21 is connected to the tip of a core of the plunger 29. A spring 36 is connected with both ends thereof to the pivotal lever 28 and to the base plate 19 so as to pull the pivotal lever 28 away from the plunger 29.

(Switch Means for the Plunger 29)

The plunger 29 is supplied with pulse current in four cases, namely:

(1) upon insertion of a cassette into the pack guide 1;

(2) upon completion of setting the cassette in its play position;

(3) upon starting of ejection of the cassette from its play position; and (4) upon completion of the cassette ejection, and pulls the pivotal lever 28. To effect pulse current supply in said four cases, this embodiment employs the following switches.

A lever switch SW₁ is provided in a rear portion of the pack guide 1 for pivotal movement in accordance with cassette insertion into the pack guide 1, so as to detect the insertion (case (1) in the above) by the pivotal movement of the lever SW₁, thereby energizing the plunger 29.

A switch SW₂ for the cassette setting completion (case (2) in the above) is positioned in a rear portion of the side plate 4 so as to be turned on when the slide plate 5 sliding along the side plate 4 reaches that portion.

A switch for starting the cassette ejection (case (3) in the above) is provided on the front face of an escutcheon not shown of the tape player so that a user manually pushes it and energizes the plunger 29.

A switch SW₄ for the ejection completion (case (4) in the above) is located in a front portion of the side plate 4 so as to be turned on by the slide plate 5 when the plate 5 slides along the side plate 4 and reaches the front portion thereof.

(B) FUNCTION

Functions of the device with the above-described construction will be described hereunder.

(Before Cassette Loading ... FIG. 3)

Before a cassette is loaded, the slide plate 5 is located in a front position with respect to the side plate 4, whereby the guide arm 2 is pushed by the lifting cam 6 of the slide plate 5 and is in the lifted position. Therefore, the pack guide 1 supported by the front end of the guide arm 2 is also lifted above the cassette play position. At the same time, since the ejection cam 13 on the slide plate 5 outwardly pulls the guide roller 12 of the swing lever 10, the U-shaped end of the swing lever 10 is located in the front position of the guide arm 2 so as to locate the pack stopper 9 engaging said end of the swing lever 10 in the front end of the guide hole 8.

Since the slide plate 5 is now located frontward, the inversion plate 25 linked thereto via the pin 27 is also rotated frontward. Then, the inversion spring 24 linked to the inversion plate 25 is positioned inside the two arms of the plate 25 and thereby pushes the associated end of the changeover plate 21 to the right in the Figure. However, since the pin 34 of the pivotal lever 28 engages the neutral concavity 31 of the cam hole 33 at the other end of the changeover plate 21, the plate 21 cannot rotate in excess of a predetermined angle. Therefore, neither of the two gears on the changeover plate 21 i.e. the loading changeover gear 22 and the ejection changeover gear 23 engages the loading drive gear 15 or the ejection drive gear 16. As the result, although the loading drive gear 15 and the ejection drive gear 16 always rotate along with rotation of the motor, the rotation is not transmitted to the cassette loading/ejecting mechanism.

Figure 4:
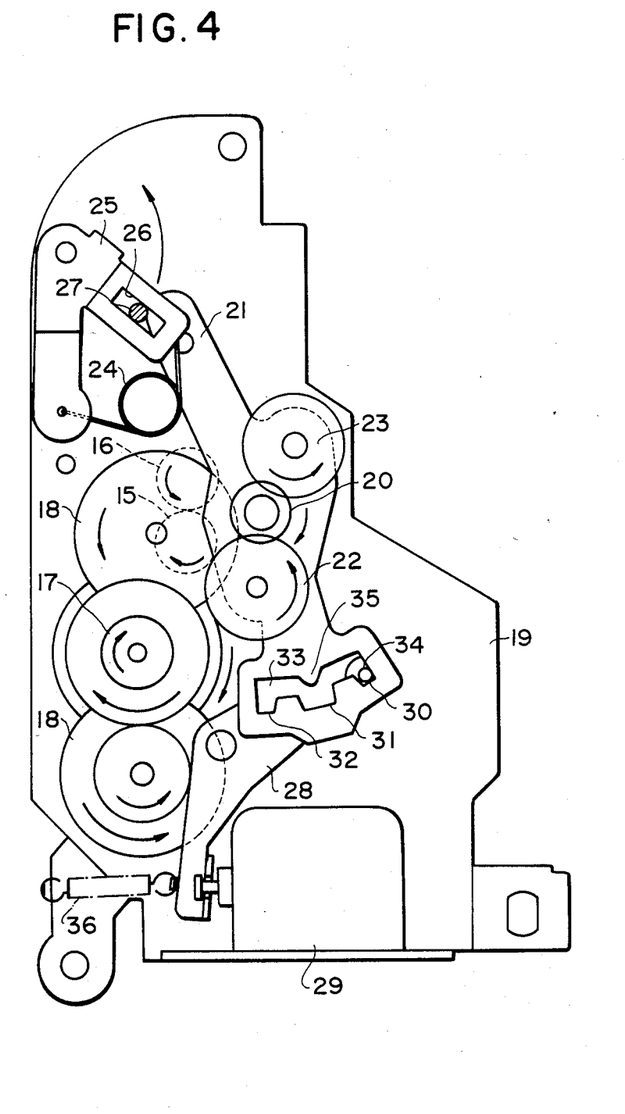

(Start of Cassette Loading ... FIG. 4)

When a cassette is inserted into the pack guide 1, it is detected by the lever switch SW₁ at the rear portion of the pack guide 1 which then turns on so as to supply the plunger 29 with a pulse of current.

When the plunger is energized and attracts the core, the pivotal lever 28 engaging the core rotates. Along with the rotation of the lever 28, the pin 34 at said one end of the lever 28 gets out of the neutral concavity of the cam hole 33, thereby letting the changeover plate 21 be free.

Since the changeover plate 21 is applied with clockwise pushing force by the inversion spring 24 as described before, it now rotates freely about the axis thereof so that the loading changeover gear 22 thereon engages the loading drive gear 15. As the result, rotation of the motor is transmitted via the loading drive gear 15, the loading changeover gear 22, transmission gear 20 to the reduction gear series 18, thereby rotating the gear 17 at the last stage of the reduction gear series 18 at a predetermined speed. Since the gear 17 engages the rack 14 of the slide plate 5, the plate 5 is shifted rearward of the tape player.

Figure 5:
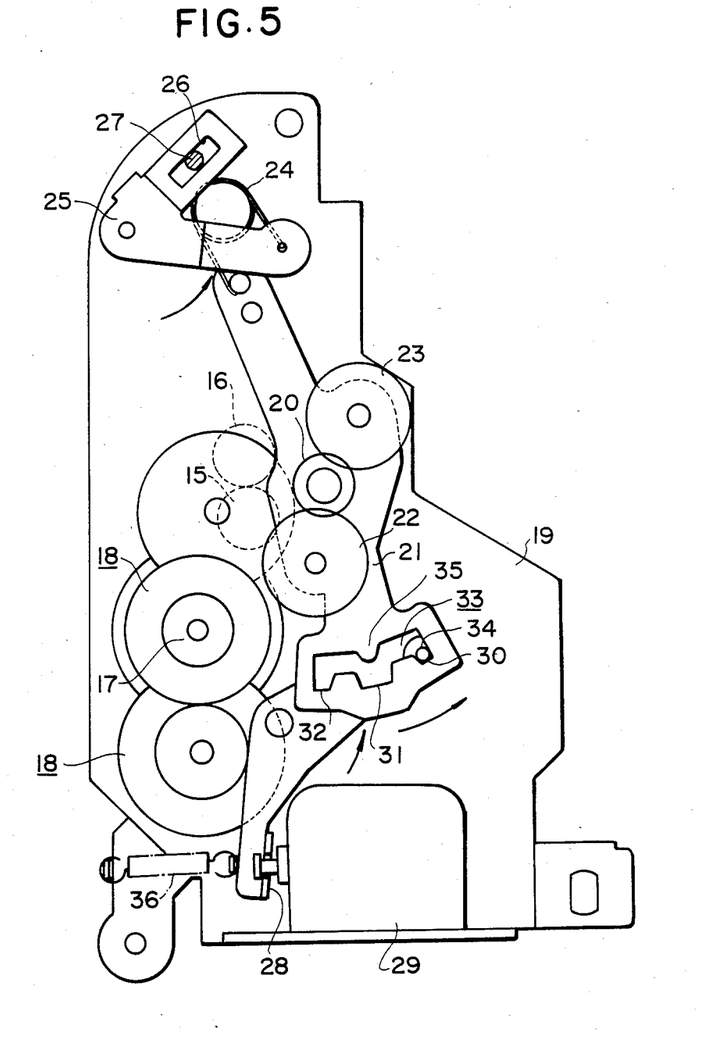
FIG. 5 shows said mechanisms half-way through cassette loading.

(Halfway of the Cassette Loading ... FIG. 5)

When the slide plate 5 starts moving rearward, the loading cam 13 thereon pushes the guide roller 12 so as to rotate the U-shaped end of the swing lever 10 rearwardly of the tape player. Then, the pack stopper 9 engaging said end of the swing lever 10 is also pulled rearwardly, whereby the nail 9a at the front end of the pack stopper 9 which engages the reel hole of the cassette pulls it fully into the pack guide 1.

The slide plate 5 further moves rearwardly after the cassette has reached the rear end of the pack guide 1 so that the lifting cam 6 on the slide plate 5 downwardly pushes the guide pin 7 of the guide arm 2. Then, the guide arm 2 rotates downwardly about the pin 3 so that the pack guide 1 linked to the front end of the guide arm 2 is lowered carrying the cassette therein, thereby setting the cassette in its play position.

In accordance with the movement of the slide plate 5, the pin 27 at the rear end thereof slides within the slit 26 of the inversion plate 25 to rotate the plate 25 through an angle in the counterclockwise direction in the Figure about its axis. Then, said one arm of the inversion plate 25 passes over the adjacent end of the changeover plate 21, whereby the inversion spring 24 connected between the inversion plate 25 and the changeover plate 21 is inverted about the end of the changeover plate 21, thereby pushes the changeover plate 21 in the counterclockwise direction to the contrary.

However, since the pin 34 of the pivotal lever 28 now engages the loading concavity 30 of the cam hole 33, the changeover plate 21 still remains in the same position against the force of the inversion spring 24. Therefore, the loading changeover gear 22 on the changeover plate 21 keeps the engagement with the loading drive gear 15 linked to the motor, whereby the slide plate 5 continues displacement deep in the tape player due to the driving force of the motor.

Figure 6:
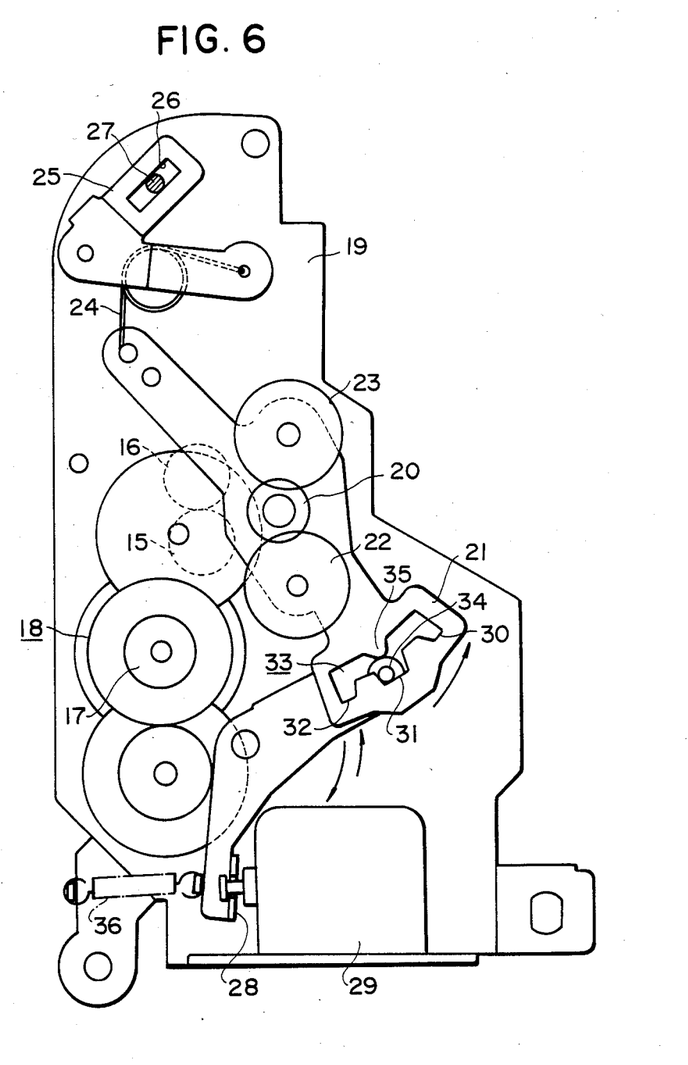
FIG. 6 shows said mechanisms at completion of cassette loading.

(Completion of the Cassette Loading ... FIG. 6)

When the cassette is set at the play position and the slide plate 5 reaches the innermost end, the switch SW₂ is turned on by the slide plate 5, thereby energizing the plunger 29 for a short time again. Due to the energization, the core is attracted and rotates the pivotal lever 28, whereby the pin 34 at said one end of the pivotal lever 28 gets out of the loading concavity 30 of the cam hole 33. Then, the changeover plate 21 rotates in the counterclockwise direction due to the force of the inversion spring 24 and disengages the loading changeover gear 22 on the changeover plate 21 from the loading drive gear 15. Since the driving force of the motor is not transmitted to the gear 17, the slide plate 5 engaging the gear 17 at the rack 14 also stops.

The pin 34 which is out of the loading concavity 30 due to attraction by the plunger 29 moves toward the ejection concavity 32 within the cam hole 33 along with the rotation of the changeover plate 21. On the way of displacement to the ejection concavity 32, the pin 34 falls in the neutral concavity 31 because the projection 35 is opposed to the neutral concavity 31 at the center of the cam hole 33 and the pivotal lever 28 carrying the pin 34 is pulled by the spring 36. As the result, the changeover plate 21 stops in the neutral position against the force of the spring 24 so that the loading changeover gear 22 and the ejection changeover gear 23 are kept away from the loading drive gear 15 and the ejection drive gear 16, thereby keeping the slide plate 5 unmoved deep in the tape player.

Figure 7:
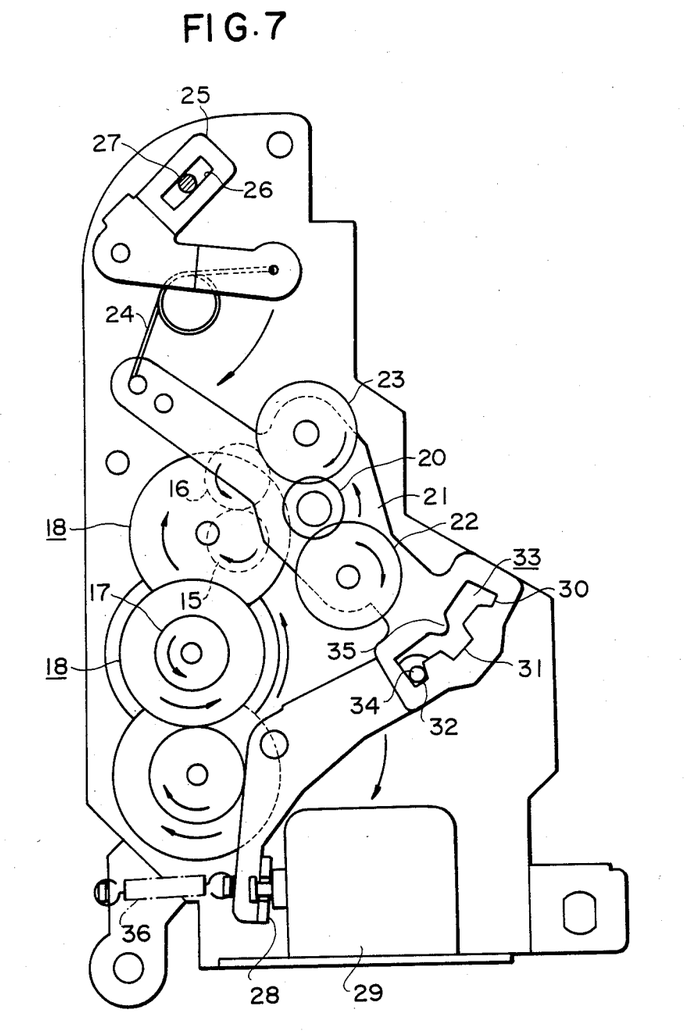
FIG. 7 shows said mechanisms at the start of cassette ejection.

(Start of Cassette Ejection ... FIG. 7)

When the eject switch on the escutcheon not shown of the tape player is pushed, the plunger 29 is energized by pulse current from the eject switch and rotates the pivotal lever 28 linked thereto. The pin 34 on said one end of the pivotal lever 28 gets out of the neutral concavity 31 of the cam hole 33 so as to permit the changeover plate 21, till now blocked by the pin 34, to rotate in the clockwise direction due to the force of the inversion spring 24. As the result, the ejection changeover gear 23 on the changeover plate 21 engages the ejection drive gear 16 always linked to the motor, whereby the driving force of the motor is transmitted via the ejection drive gear 16, the ejection changeover gear 23, the transmission gear 20, the reduction gear series 18 to the gear 17 so as to rotate the gear 17 in the direction opposite to that in the loading process.

Figure 8:
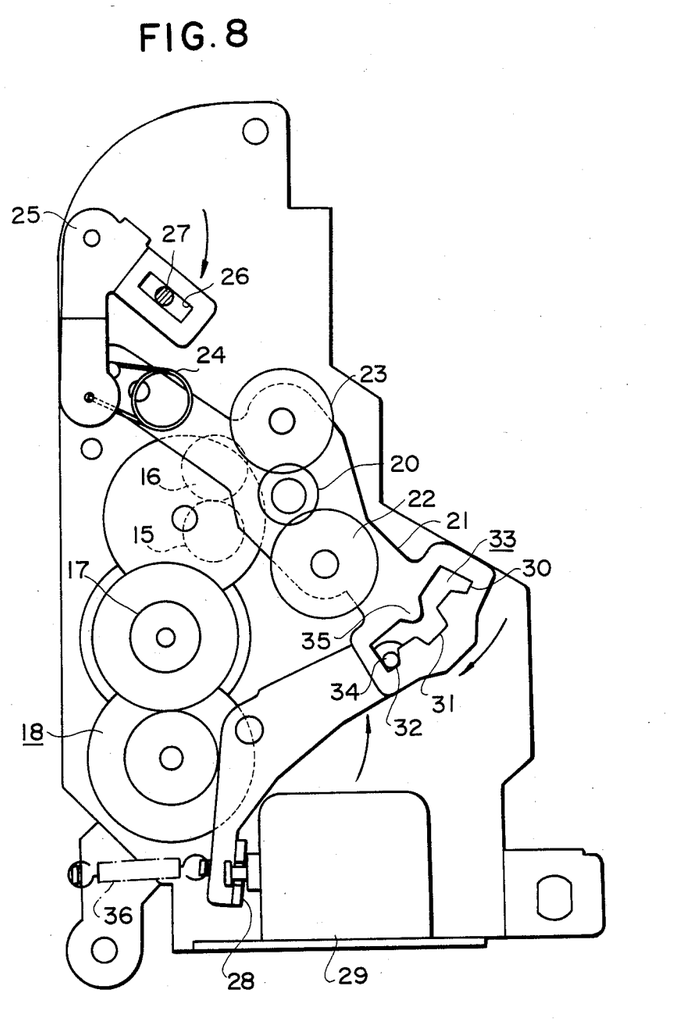
FIG. 8 shows said mechanisms at the completion of cassette ejection.

(Halfway of Cassette Ejection ... FIG. 8)

Along with the rotation of the gear 17 in the opposite direction, the slide plate 5 engaging therewith via the rack 14 moves forwardly of the tape player. Thereby, the guide arm 2 is raised by the lifting cam 6 of the slide plate 5 contrary to the loading process to raise the pack guide 1 connected to the guide arm 2 and the cassette in the pack guide 1 from the play position. Next, the swing lever 10 is rotated by the ejection cam 13 of the guide arm 2 so that the U-shaped end of the swing lever 10 shifts the pack stopper 9 frontwardly. The cassette in the pack guide 1 is then pushed frontwardly by the stopper tongue 9b of the pack stopper 9.

In this case, the pin 27 on the slide plate 5 rotates the inversion plate 25 in the clockwise direction along with the frontward displacement of the slide plate 5 so that said one arm of the inversion plate 25 passes over the associated end of the changeover plate 21 again and returns outside the changeover plate 21. At the same time, the inversion spring 24 between the inversion plate 25 and the changeover plate 21 is inverted and pushes the associated end of the changeover plate 21 in the clockwise direction.

In this state, however, the changeover plate 21 does not move yet because the pin 34 of the pivotal lever 28 engages the ejection concavity 32 of the cam hole 33, thereby keeping the engagement between the ejection changeover gear 23 on the changeover plate 21 and the ejection drive gear 16.

(Completion of Cassette Ejection ... FIG. 3)

When the slide plate 5 reaches the foremost end of the tape player and contacts the switch SW4 at the front end of the side plate 4, the plunger 29 is energized to rotate the pivotal lever 28. The pin 34 on the pivotal lever 28 then gets out of the ejection concavity 32 and consequently falls in the neutral concavity 31 due to cooperation of the projection 35 and the spring 36. The changeover plate 21 pushed by the inversion spring 24 also rotates in the clockwise direction to disengage the ejection changeover gear 23 thereon from the ejection drive gear 16 and stops in the neutral position.

By repeating the above-discribed processes from FIG. 3 to FIG. 8, cassette loading/ejecting operation is automatically performed using the driving force of the motor.

C. EFFECTS OF THE EMBODIMENT

As described in the above, the embodiment enables cassette loading/ejecting operation by use of the motor power but without inverting rotating direction of the motor.

Particularly, since the inversion spring 24 is inverted when the inversion plate 25 engaging the loading/ejecting mechanism passes over a given point according to the embodiment, it is possible to push the changeover plate 21 onto the loading group mechanism and the ejecting group mechanism by use of only one inversion spring 24. Therefore, the entire mechanism of the device is simple as compared to a structure employing two plungers or employing a combination of a plunger and a spring in order to attract the changeover plate 24 in the opposite directions. Further, it should be noted that considerable power is needed for changeover action of the changeover plate 21 in order to ensure engagement between the drive gears and the changeover gears. If the changeover is carried out by one or two plungers, the plungers must have large capacities. However, since the embodiment is arranged to keep engagement between the drive and changeover gears by use of the spring which is inverted by the motor power, the plunger capacity may be small, namely merely enough to perform changeover between the respective modes. This leads to reduction in size of the device as a whole and to reduction of power consumption.

Further, a specific effect of the embodiment is that the changeover plate 21 stops in the neutral position because the cam hole 33 of the changeover plate 21 includes the neutral concavity 31, thereby involving a clutching function between the motor group and the cassette loading/ejecting mechanism. Therefore, inertia of the motor does not cause overruns of the mechanisms linked thereto which could not be prevented in a structure which employs a gear mechanism always engaging an inversible motor so as to effect cassette loading-/ejecting by inverting the motor. This ensures reliable cassette loading/ejecting changeover operation.

OTHER EMBODIMENTS

The present invention is never restricted to the embodiment shown in the Figure but also permits the following other embodiments.

The neutral concavity 31 of the cam hole 33 in the changeover plate 21 may be omitted so that the changeover plate 21 is always located in the loading concavity or in the ejection concavity. In this case, if the tape drive motor is used to drive the loading/ejecting mechanism, the motor power will be transmitted to the loading/ejecting mechanism also during tape reproduction as it is. To prevent this, an idler interlocked with a head plate or other members which operate during tape reproduction may be interposed among the reduction gear series 18, or alternatively, a gear of the reduction gear series 18, the gear 17 engaging the rack 14 or the transmission gear may be arranged to run idle when a torque exceeding a predetermined value is applied thereto.

A cassette in the pack guide 1 may directly engage the slide plate 5 so that the slide plate 5 directly loads or ejects the cassette, instead of employing the swing lever 10.

If the tape player is arranged to pull a cassette parallel into the pack guide 1 so that insertions of reel shafts and pack guide pins into the cassette may effected by raising the relevant mechanism of the tape player, it is not necessary to raise and lower the guide arm 2 by the slide plate 5, and moreover, the guide arm 2 itself may be omitted.

Instead of employing the lever $SW_1$ provided at the rear end of the pack guide 1 to detect the cassette insertion into the pack guide 1, the plunger 29 may be energized by the eject switch provided on the escutcheon of the tape player after the cassette is manually inserted into the pack guide 1.

The numbers of the drive gears and the changeover gears need not be two, respectively, as shown in the Figures. For example, one drive gear may alternatively engage two changeover gears, or two drive gears rotating in the opposite directions may engage one idler type changeover gear.

EFFECTS OF THE INVENTION

As described in the above, since the invention enables cassette loading/ejecting without inverting the motor, no reverse generated current is produced due to inertia of the motor, thereby preventing troubles of the motor and of the changeover switches. Further, since the engagement between the changeover gear and the drive gear is maintained by only one, inversion spring in both the loading process and the ejecting process, it is possible to reduce the number of parts and to employ a smaller capacity plunger, thereby leading to simplification and reduction of the entire structure of the device.

I claim:

1. A cassette loading/ejecting device in a cassette-type tape player including a slide plate slidable from front to rear of the tape player, said slide plate including a cassette guide portion to guide a cassette inserted from front to rear of the tape player, thereby moving the cassette between an insertion position and a play position in accordance with movement of said slide plate, wherein said cassette loading/ejecting device comprises:
   a motor rotatable in only one direction to drive a tape in said tape player;
   a driving mechanism interposed between said motor and said slide plate to move said slide plate between front and rear positions in said tape player in response to rotation of said motor in said one direction;
   a changeover plate pivotally provided in said driving mechanism for pivoting to invert the direction in which said slide plate is driven by rotation of said motor in said one direction;
   a cassette loading drive gear and a cassette ejection drive gear provided in said driving mechanism for driving by said motor;
   a cassette loading changeover gear and a cassette ejection changeover gear provided on said changeover plate so as to selectively engage respective said drive gears in response to said pivoting of said changeover plate;
   an inversion plate pivotally disposed adjacent to said changeover plate for pivoting through an angle concurrent with said movement of said slide plate;
   an inversion spring so connected between said inversion plate and said changeover plate that the direction of the pushing force of said inversion spring against said changeover plate is inverted by pivoting of said inversion plate; and
   a means responsive to insertion or ejection of said cassette to allow pivoting of said changeover plate.

2. A cassette loading/ejecting device as set forth in claim 1 wherein said means responsive to insertion or ejection includes a plunger responsive to said insertion or ejection, and said changeover plate includes a cam means having three concavities for loading mode, neutral mode and ejecting mode, respectively, said cassette loading/ejecting device further including a pin engaging said cam means and driven by said plunger.

3. A cassette loading/ejecting device as set forth in claim 2 further comprising first switch means responsive to cassette insertion into said pack guide portion for energization of said plunger, second switch means responsive to completion of cassette setting at the play position for energization of said plunger and third switch means responsive to cassette ejection for energization of said plunger.

* * * * *